(12) United States Patent
Cho et al.

(10) Patent No.: US 8,982,193 B2
(45) Date of Patent: Mar. 17, 2015

(54) MULTIVIEWABLE STEREOSCOPIC IMAGE DISPLAY DEVICE AND METHOD FOR DRIVING THE SAME

(75) Inventors: Byoungchul Cho, Seoul (KR); Juneung Kim, Uijeongbu-si (KR); Changkyun Park, Inchon (KR)

(73) Assignee: LG Display Co., Ltd., Seoul (KR)

( * ) Notice: Subject to any disclaimer, the term of this patent is extended or adjusted under 35 U.S.C. 154(b) by 360 days.

(21) Appl. No.: 13/315,065

(22) Filed: Dec. 8, 2011

(65) Prior Publication Data

US 2012/0235989 A1    Sep. 20, 2012

(30) Foreign Application Priority Data

Mar. 15, 2011    (KR) ........................ 10-2011-0022870

(51) Int. Cl.
*G06T 15/00* (2011.01)
*H04N 13/04* (2006.01)
*B60K 35/00* (2006.01)
*G02B 27/22* (2006.01)
*G09G 3/00* (2006.01)
*G09G 3/34* (2006.01)

(52) U.S. Cl.
CPC .............. *H04N 13/045* (2013.01); *B60K 35/00* (2013.01); *G02B 27/2264* (2013.01); *G09G 3/003* (2013.01); *H04N 13/0452* (2013.01); *G09G 3/3406* (2013.01); *G09G 2320/0209* (2013.01); *H04N 13/0438* (2013.01); *H04N 2013/0463* (2013.01); *B60K 2350/106* (2013.01); *B60K 2350/901* (2013.01); *B60K 2350/903* (2013.01); *B60K 2350/2017* (2013.01); *B60K 2350/352* (2013.01)
USPC .......................................................... 348/51

(58) Field of Classification Search
None
See application file for complete search history.

(56) References Cited

U.S. PATENT DOCUMENTS

| | | | |
|---|---|---|---|
| 2007/0266412 | A1 | 11/2007 | Trowbridge et al. |
| 2009/0135910 | A1* | 5/2009 | Jung ........................ 375/240.16 |
| 2010/0007582 | A1* | 1/2010 | Zalewski ........................... 345/8 |

(Continued)

FOREIGN PATENT DOCUMENTS

| | | |
|---|---|---|
| CN | 101543085 A | 9/2009 |
| CN | 101923221 A | 12/2010 |

(Continued)

OTHER PUBLICATIONS

Chinese Office Action dated Oct. 31, 2014 for Chinese Patent Application No. 201110374940.3.

*Primary Examiner* — Thai Tran
*Assistant Examiner* — Sunghyoun Park
(74) *Attorney, Agent, or Firm* — Birch, Stewart, Kolasch & Birch, LLP

(57) ABSTRACT

A multiviewable stereoscopic image display device and a method for driving the same are provided. The stereoscopic image display device includes: a display panel that displays a 2D image in the 2D mode and displays a 3D image in the 3D mode; a control unit that receives first to m-th image data (m is a natural number greater than 2), and in the 3D mode time-divides and sequentially outputs the left-eye image data of each of the first to m-th image data, and then time-divides and sequentially outputs the right-eye image data of each of the first to m-th image data; and first to m-th liquid crystal shutter glasses that open and close the left-eye shutter and the right-eye shutter in synchronization with each of the first to m-th liquid crystal shutter glass control signals generated from the control unit.

12 Claims, 9 Drawing Sheets

(56) References Cited

U.S. PATENT DOCUMENTS

| | | | |
|---|---|---|---|
| 2010/0110163 A1* | 5/2010 | Bruls et al. | 348/43 |
| 2010/0157032 A1* | 6/2010 | Park et al. | 348/57 |
| 2010/0225645 A1* | 9/2010 | Suh et al. | 345/419 |
| 2011/0001806 A1* | 1/2011 | Nakahata et al. | 348/56 |
| 2011/0109656 A1 | 5/2011 | Nakagawa et al. | |

FOREIGN PATENT DOCUMENTS

| | | |
|---|---|---|
| CN | 101944338 A | 1/2011 |
| WO | WO 2010/147311 A2 | 12/2010 |

\* cited by examiner

MULTIVIEWABLE STEREOSCOPIC IMAGE DISPLAY DEVICE AND METHOD FOR DRIVING THE SAME

This application claims the benefit of Korean Patent Application No. 10-2011-0022870 filed on Mar. 15, 2011, the entire contents of which is incorporated herein by reference for all purposes as if fully set forth herein.

BACKGROUND

1. Field

This document relates to a multiviewable stereoscopic image display device and method for driving the same.

2. Related Art

With rising public interest in display devices and increasing need for using portable information media, research, studies and commercialization for flat panel display (FPD) devices that replace conventional cathode ray tubes (CRTs) have been in progress. The flat panel display devices comprise liquid crystal displays LCDs, field emission displays FEDs, plasma display panels PDPs, and electroluminescence devices.

Recently, multiview display devices that show different images to viewers located at different angles from each other are being developed. For example, in a multiview navigation system as shown in FIG. 1, a map image is presented to a driver (user A), and a movie or TV program is presented to an assistant driver's seat viewer (user B).

However, the conventional multiview display device has the problem that it can display a two-dimensional image in multiview, but a three-dimensional stereoscopic image cannot be displayed in multiview. Recently, there is an increasing demand for stereoscopic image display devices using a flat panel display device. Hence, stereoscopic image display devices by which multiple users can multiview without interference with other users are needed.

SUMMARY

An aspect of this document is to provide a stereoscopic image display device comprising: a display panel that displays a 2D image in the 2D mode and displays a 3D image in the 3D mode; a control unit that receives first to m-th image data (m is a natural number greater than 2) from the outside, and addresses 3D image data to the display panel in the 3D mode, the 3D image data being obtained by time-dividing and sequentially outputting the left-eye image data of each of the first to m-th image data, and time-dividing and sequentially outputting the right-eye image data of each of the first to m-th image data; and first to m-th liquid crystal shutter glasses that open and close the left-eye shutter and the right-eye shutter in synchronization with each of the first to m-th liquid crystal shutter glass control signals generated from the control unit, wherein, in the 3D mode, only the left-eye shutter of each of the first to m-th liquid crystal shutter glasses is opened in synchronization with a period during which the left-eye image data of each of the first to m-th image data is output, and only the right-eye shutter of each of the first to m-th liquid crystal shutter glasses is opened in synchronization with a period during which the right-eye image data of each of the first to m-th image data is output.

Another aspect of this document is to provide a method for driving a stereoscopic image display device comprising a display panel that displays a 2D image in the 2D mode and displays a 3D image in the 3D mode, the method comprising: receiving first to m-th image data (m is a natural number greater than 2) from the outside, and addressing 3D image data to the display panel in the 3D mode, the 3D image data being obtained by time-dividing and sequentially outputting the left-eye image data of each of the first to m-th image data, and time-dividing and sequentially outputting the right-eye image data of each of the first to m-th image data; and opening and closing the left-eye shutter and the right-eye shutter in synchronization with each of the first to m-th liquid crystal shutter glass control signals generated from the control unit, wherein, in the 3D mode, only the left-eye shutter of each of the first to m-th liquid crystal shutter glasses is opened in synchronization with a period during which the left-eye image data of each of the first to m-th image data is output, and only the right-eye shutter of each of the first to m-th liquid crystal shutter glasses is opened in synchronization with a period during which the right-eye image data of each of the first to m-th image data is output.

BRIEF DESCRIPTION OF THE DRAWINGS

The accompanying drawings, which are included to provide a further understanding of the invention are incorporated in and constitute a part of this specification, illustrate embodiments of the invention and together with the description serve to explain the principles of the invention. In the drawings.

DETAILED DESCRIPTION

Figure 1:
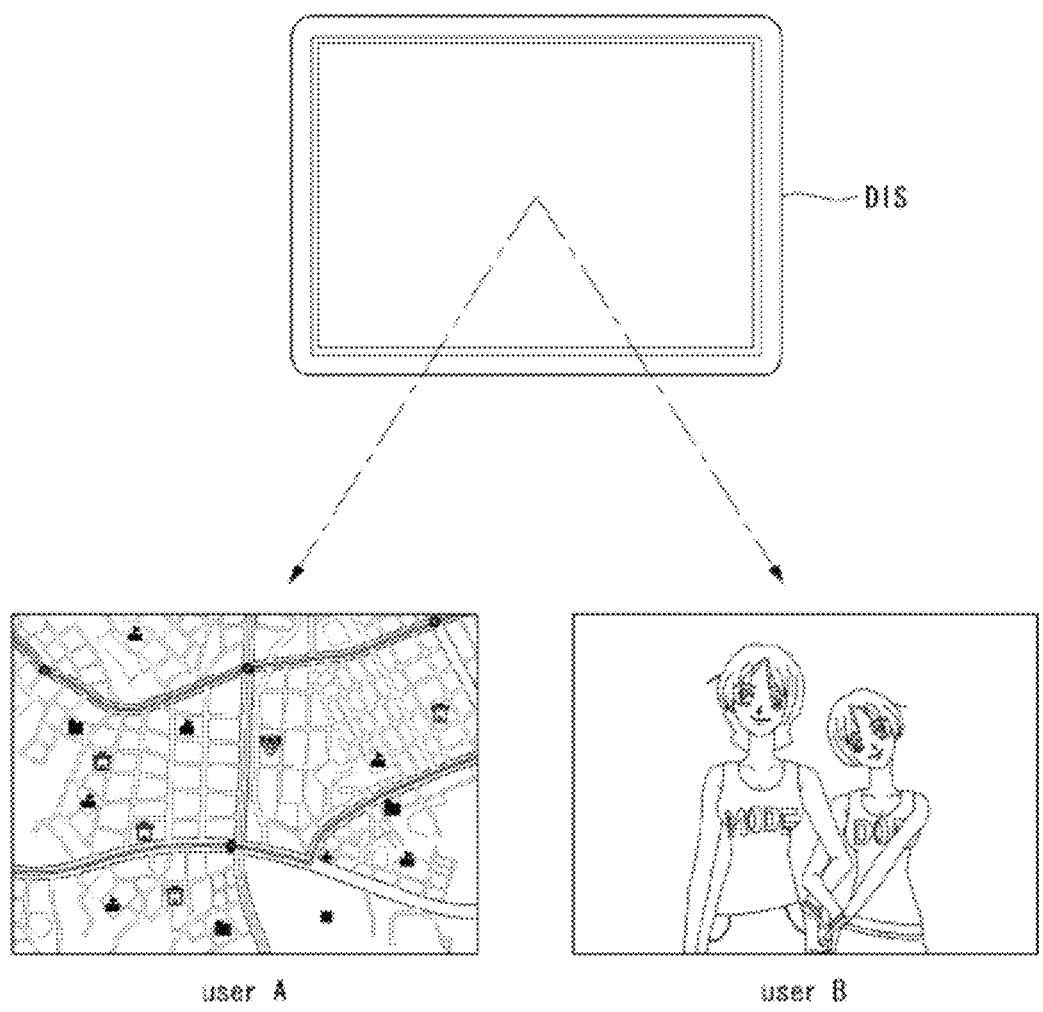
FIG. 1 is a view schematically showing a related art multiview display device.

Hereinafter, exemplary embodiments of the present invention will be described in detail with reference to the attached drawings. Throughout the specification, the same reference numerals indicate substantially the same components. In connection with description of the present invention hereinafter, if it is considered that description of known functions or constructions related to the present invention may make the subject matter of the present invention unclear, the detailed description thereof will be omitted. Terms which will be described hereinafter are established taking into consideration easiness of writing the specification into account and may vary according to manufacturer's intention or a usual practice in the related art.

Figure 2:
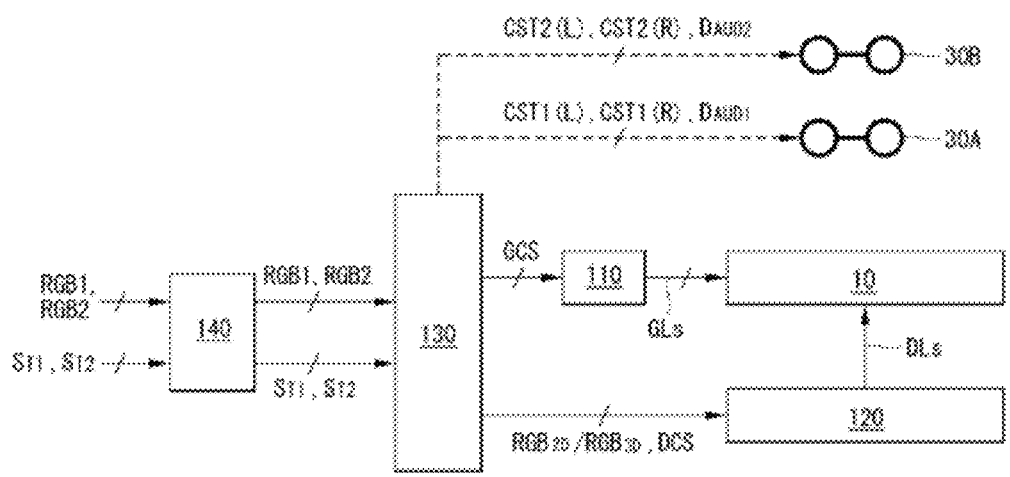
FIG. 2 is a block diagram showing a multiviewable stereoscopic image display device according to an exemplary embodiment of the present invention.

FIG. 2 is a block diagram showing a multiview able stereoscopic image display device according to an exemplary embodiment of the present invention. Referring to FIG. 2, the stereoscopic image display device according to the exemplary embodiment of the present invention comprises a display panel 10, a plurality of liquid crystal shutter glasses 30A and 30B, a gate driving unit 110, a data driving unit 120, a control unit 130, and a host system 140. The display panel 10 of the stereoscopic image display device of the present invention may be implemented as a flat panel display device, such as a liquid crystal display LCD, a field mission display FED, a plasma display panel PDP, and an organic light emitting diode OLED. Although the present invention has been illustrated focusing on the implementation the display panel 10 as a liquid crystal display in the following exemplary embodiment, it should be noted that the present invention is not limited thereto.

The display panel 10 comprises two substrates and a liquid crystal layer formed therebetween. A plurality of data lines DLs and a plurality of gate lines GLs intersecting the data lines DLs are disposed on the lower substrate of the display panel 10. A plurality of pixels of a liquid crystal cell are disposed in matrix form on the display panel 10 by the intersecting structure of these signal lines DLs and GLs. A black matrix, a color filter, and a common electrode of the liquid crystal cells are formed on the upper substrate of the display panel 10. The common electrode is formed on the upper substrate in a vertical electric filed type driving configuration such as a twisted nematic (TN) mode and a vertical alignment (VA) mode. Alternatively, the common electrode may be formed on the lower glass substrate together with the pixel electrode in a horizontal electric field type driving configuration such as an in-plane switching (IPS) mode and a fringe field switch (FFS) mode. Polarizers are disposed on the respective upper and lower glass substrates of the liquid crystal display panel, respectively, and alignment films for setting a pre-tilt angle of the liquid crystals are formed on an inner surface contacting the liquid crystal.

When the display panel 10 is implemented in a transmissive mode, the stereoscopic image display device may further comprise a backlight unit (not shown). The backlight unit is switched on and off according to a driving current generated from the backlight unit driving unit. The backlight unit comprises light sources that are switched on according to a driving current supplied from the backlight unit driving unit, a light guide plate (or diffusing plate), and a plurality of optical sheets. The backlight unit may be implemented using a direct type backlight unit or an edge type backlight unit. The light sources of the backlight unit may be implemented by one or two types of light sources among a hot cathode fluorescent lamp (HCFL), a cold cathode fluorescent lamp (CCFL), an external electrode fluorescent lamp (EEFL), and a light emitting diode (LED). The backlight unit driving unit generates a driving current for switching on the light sources of the backlight unit.

The liquid crystal shutter glasses 30A and 30B comprises a left-eye shutter STL and a right-eye shutter STR that are electrically individually controlled. The left-eye shutter STL and the right-eye shutter STR each comprise a first transparent substrate, a first transparent electrode formed on the first transparent substrate, a second transparent substrate, a second transparent electrode formed on the second transparent substrate, and a liquid crystal layer interposed between the first and second transparent substrates. A reference voltage is supplied to the first transparent electrode, and an ON/OFF voltage is supplied to the second transparent electrode.

The first and second liquid crystal shutter glasses 30A and 30B comprise a liquid crystal shutter glass control signal reception unit for receiving liquid crystal shutter glass control signals CSTL(L), CST1(R), CST2(L), and CST2(R). In response to the first liquid crystal shutter glass control signals CST1(L) and CST1(R), the left-eye shutter STL and right-eye shutter STR of the first liquid crystal shutter glasses 30A transmits light from the display panel 10 when an ON voltage is supplied to the second transparent electrode, and blocks light from the display panel 10 when an OFF voltage is supplied to the second transparent electrode. In response to the second liquid crystal shutter glass control signal CST2(L) and CST2(R), the left-eye shutter STL and right-eye shutter STR of the second liquid crystal shutter glasses 30B transmits light from the display panel 10 when an ON voltage is supplied to the second transparent electrode, and blocks light from the display panel 10 when an OFF voltage is supplied to the second transparent electrode.

Moreover, audio is varied for each image that the user views. Thus, the first and second liquid crystal shutter glasses 30A and 30B may comprise an audio signal reception unit for receiving first audio data DAUD1 synchronized with first image data and second audio data DAUD2 synchronized with second image data. The first liquid crystal shutter glasses 30A receive the first audio data DAUD1, and the second liquid crystal shutter glasses 30B receive second audio data DAUD2. Thus, each user may hear audio synchronized with the image that they are viewing. The communication technologies for transmitting and receiving audio signals may comprise Bluetooth, Radio Frequency Identification (RFID), InfraRed Data Association (IrDA), Ultra Wideband (UWB), ZigBee, etc.

The gate driving unit 10 sequentially supplies gate pulses synchronized with the data voltages to the gate lines GLs under control of the control unit 130. The level shifter for converting a swing width of an output signal of the shift register into a swing width which is suitable for driving the TFT of the liquid crystal cell, and an output buffer. The gate driving unit 110 may be attached to the display panel 10 in a taped automated bonding (TAB) method, or may be formed on the lower substrate of the display panel 10 in a gate drive IC in panel (GIP) method. In the GIP method, the level shifter may be mounted on a printed circuit board (PCB), and the shift register may be formed on the lower substrate of the display panel 10.

The data driving unit 120 comprises a plurality of source drive ICs. The source drive ICs convert 2D image data RGB2D input from the control unit 130 into analog data voltages according to positive/negative gamma compensation voltages. The source drive ICs convert 3D image data RGB3D comprising left-eye image data RGBL and right-eye image data RGBR input from the control unit 130 in the 3D mode into analog data voltages according to positive/negative gamma compensation voltages. The analog data voltages output from the source drive ICs are supplied to the data lines DLs of the display panel 10.

The control unit 130 may generate a gate driving unit control signal GCS, a data driving unit control signal DCS, and liquid crystal shutter glass control signals CST1(L), CST1(R), CST2(L), and CST2(R). For simplicity of explanation, the following description will be made with respect to an example in which the control unit 130 drives the display panel 10 at a frame frequency of 240 Hz. However, it should be noted that the present invention is not limited thereto.

The controller 130 receives, from the host system 140, first image data RGB1, a first timing signal ST1 synchronized with the first image data RGB1, second image data RGB2, and a second timing signal ST2 synchronized with the second image data RGB2. The control unit 130 generates and outputs multiviewable 2D or 3D image data RGB2D/RGB3D from the first and second image data RGB1 and RGB2 and the first and second timing signals ST1 and ST2. For the 2D image data RGB2D, the first image data RGB1 and the second image data RGB2 are time-divided and sequentially output. For the 3D image data RGB3D, the left-eye image data RGB1 (L) of the first image data, the left-eye image data RGB2(L) of the second image data, the right-eye image data RGB1(R) of the first image data, and the right-eye image data RGB2(R) of the second image data are time-divided and sequentially output. Moreover, the control unit 130 generates and outputs a gate driving unit control signal GCS, a data driving unit control signal DCS, and liquid crystal shutter glass control signals CST1(L), CST1(R), CST2(L), and CST2(R).

The first and second timing signals ST1 and ST2 comprise a horizontal synchronization signal, a vertical synchronization signal, a data enable signal, and a dot clock. The horizontal synchronization signal is a signal that is repeated each 1 horizontal period, and the vertical synchronization signal is a signal that is repeated each 1 vertical period. 1 horizontal period is substantially identical to 1 line scanning period when data is written in the pixels of 1 line on the display panel 10, and 1 vertical period is substantially identical to 1 frame period when data is written to all the line pixels of the display panel 10. The data enable signal is a signal indicative of the presence or absence of data, and the dot clock is a clock signal that is repeated at short periods.

The gate driving unit control signal GCS comprises a gate start pulse, a gate shift clock, and a gate output enable signal. The gate start pulse controls the timing of the first gate pulse. The gate shift clock is a clock signal for shifting the gate start pulse. The gate output enable signal controls the output timing of the gate driving unit 110.

The data driving unit 120 control signal DCS comprises a source start pulse, a source sampling clock, a source output enable signal, and a polarity control signal. The source start pulse controls the data sampling start point of the data driving unit 120. The source sampling clock is a clock signal for controlling the sampling operation of the data driving unit 120 based on a rising or falling edge. When digital video data to be input into the data driving unit 120 is transmitted in a low voltage differential signaling (LVDS) interface specification, the source start pulse and the source sampling clock may be omitted. The polarity control signal inverts the polarity L (L is a natural number) of a data voltage output from the data driving unit 120 each horizontal period. The source output enable signal controls the output timing of the data driving unit 120.

The liquid crystal shutter glass control signals comprise the first liquid crystal shutter glass control signals CST1(L) and CST1(R) and the second liquid crystal shutter glass control signal CST2(L) and CST2(R). Moreover, the first liquid crystal shutter glass control signals CST1(L) and CST1(R) comprise the first left-eye liquid crystal shutter glass control signal CST1(L) and the first right-eye liquid crystal shutter glass control signal CST1(R). The second liquid crystal shutter glass control signals CST2(L) and CST2(R) comprise the second left-eye liquid crystal shutter glass control signal CST2(L) and the second right-eye liquid crystal shutter glass control signal CST2(R).

In the 2D mode, the first liquid crystal shutter glass control signals CST1(L) and CST1(R) are synchronized with the address period of the first image data RGB1 among the 2D image data RGB2D to simultaneously open the left-eye shutter STL and right-eye shutter STR of the first liquid crystal shutter glasses 30A. The second liquid crystal shutter glass control signals CST2(L) and CST2(R) are synchronized with the address period of the second image data RGB2 among the 2D image data RGB2D to simultaneously open the left-eye shutter STL and right-eye shutter STR of the second liquid crystal shutter glasses 30B.

In the 3D mode, the first left-eye liquid crystal shutter glass control signal CST1(L) is synchronized with the address period of the left-eye image data RGB1(L) of the first image data among the 3D image data RGB3D to open the left-eye shutter STL of the first liquid crystal shutter glasses 30A. The first right-eye liquid crystal shutter glass control signal CST1(R) is synchronized with the addressing period of the right-eye image data RGB1(R) of the first image data to open the right-eye shutter STR of the first liquid crystal shutter glasses 30A. The second left-eye liquid crystal shutter glass control signal CST2(L) is synchronized with the address period of the left-eye image data RGB2(L) of the second image data among the 3D image data RGB3D to open the left-eye shutter STL of the second liquid crystal shutter glasses 30B. The second right-eye liquid crystal shutter glass control signal CST2(R) is synchronized with the addressing period of the right-eye image data RGB2(R) of the second image data to open the right-eye shutter STR of the second liquid crystal shutter glasses 30B.

Moreover, the control unit 130 may comprise an audio data control unit that outputs first audio data DAUD1 synchronized with the first image data RGB1, or second audio data DAUD2 synchronized with the second image data RGB2. A detailed description of the control unit 130 will be described in conjunction with FIG. 3.

The host system 140 outputs the first image data RGB1, a first timing signal ST1 synchronized with the first image data RGB1, the second image data RGB2, and a second timing signal ST2 synchronized with the second image data RGB2 to the control unit 130. The host system 140 comprises a system-on-chip (hereinafter, "SoC") having a scaler incorporated therein to convert image data from external video sources into a data format with a resolution appropriate to display it on the display panel 10.

Meanwhile, for the convenience of explanation, FIG. 2 illustrates that the first and second image data RGB1 and RGB2 are input, and the user views a multiview image using the first and second liquid crystal shutter glasses 30A and 30B. However, it should be noted that the present invention is not limited thereto. The control unit 130 can receive first to m-th image data (m is a natural number greater than 2) from the host system 140. In this case, the control unit 130 can drive the display panel 10 at a frame frequency equal to or greater than 240 Hz, and may comprise the first to m-th liquid crystal shutter glasses controlled by the first to m-th liquid crystal shutter glasses, respectively.

Figure 3:
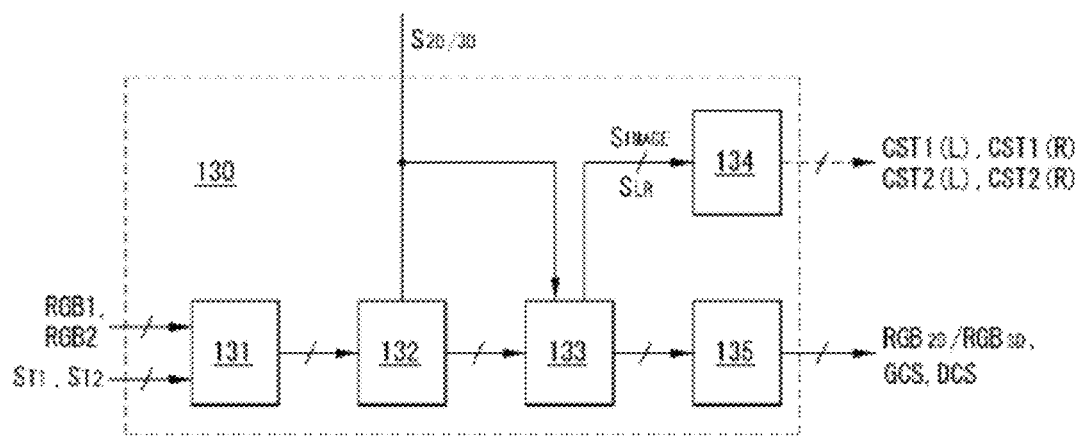
FIG. 3 is a block diagram showing in detail the control unit of FIG. 2.

FIG. 3 is a block diagram showing in detail the control unit of FIG. 2. Referring to FIG. 3, the control unit 130 according to the exemplary embodiment of the present invention comprises an image data compensation unit 131, a 3D formatter 132, a multiview image generation unit 133, a liquid crystal shutter glass control unit 134, and a display panel control unit 135.

The image data compensation unit 131 receives first and second image data RGB1 and RGB2 and first and second timing signals ST1 and ST2 from the host system 140. The image data compensation unit 131 estimates and compensates the image of the first and second image data RGB1 and RGB2 input at a frame frequency of 60 Hz by using the Motion Estimation/Motion Compensation (MEMC) technology to generate the first and second image data RGB1 and RGB2 having a frame frequency of 240 Hz. The image data compensation unit 131 outputs the first and second image data RGB1 and RGB2 estimated and compensated to be driven at the frame frequency of 240 Hz to the 3D formatter 132.

The 3D formatter 132 receives first and second image data RGB1 and RGB2 from the image data compensation unit 131, and receives 2D/3D discrimination signals from the host system 140. The 2D/3D discrimination signals S2D/3D are generated at a low level (or high level) when 2D image data is input from the outside, and generated at a high level (or low level) if 3D image data is input from the outside. Thus, the 2D/3D discrimination signals S2D/3D allow the 3D formatter 132 to identify the 2D mode and the 3D mode.

In the 2D mode, the 3D formatter 132 outputs the first and second image data RGB1 and RGB2 input from the image data compensation unit 131 as it is in the 2D mode. In the 3D mode, the 3D formatter 132 converts the first and second image data RGB1 and RGB2 input from the image data compensation unit 131 according to the 3D format, and outputs them. In the 3D mode, the 3D formatter 132 alternately outputs the left-eye image data RGB1(L) and right-eye image data RGB1(R) of the first image data RGB1 every 1 frame period. That is, the 3D formatter 132 outputs the left-eye image data RGB1(L), during the (N+1)th frame (N is a natural number including 0), outputs the right-eye image RGB1(R) during the (N+2)th frame, outputs the left-eye image data RGB1(L) during the (N+3)th frame, and outputs the right-eye image RGB1(R) during the (N+4)th frame. In the 3D mode, the 3D formatter 132 converts the second image data RGB2 as well into 3D format, and outputs it in the same manner as the first image data RGB1.

The multiview image generation unit 133 receives the first and second image data RGB1 and RGB2 from the 3D formatter 132, and receives 2D/3D discrimination signals S2D/3D from the host system 140. In the 2D mode, the multiview image generation unit 133 time-divides each of the first and second image data RGB1 and RGB2 and sequentially outputs them. That is, the multiview image generation unit 133 outputs the first image data RGB1, during the (N+1)th frame, outputs the second image data RGB2 during the (N+2)th frame, outputs the first image data RGB1 during the (N+3)th frame, and outputs the second image data RGB2 during the (N+4)th frame. A detailed description thereof will be described later in a first exemplary embodiment in conjunction with FIGS. 4 and 5 and in a second exemplary embodiment in conjunction with FIGS. 6 and 7.

In the 3D mode, the multiview image generation unit 133 time-divides the left-eye image data of the first and second image data RGB1 and RGB2 and sequentially outputs them, and then time-divides the right-eye image data of the first and second image data RGB1 and RGB2 and sequentially outputs them. That is, in the 3D mode, the multiview image generation unit 133 outputs the left-eye image data RGB1(L) of the first image data during the (N+1)th frame, outputs the left-eye image data RGB2(L) of the second image data during the (N+2)th frame, outputs the right-eye image data RGB1(R) of the first image data during the (N+3)th frame, and outputs the right-eye image data RGB2(R) of the second image data during the (N+4)th frame. A detailed description thereof will be described in a third exemplary embodiment of the present invention in conjunction with FIGS. 8 and 9.

Although the exemplary embodiment of the present invention has illustrated a method for operating the control unit 130, focusing on the case where the first and second image data RGB1 and RGB2 are input, it should be noted that the present invention is not limited thereto. The control unit 130 can convert each of the first to m-th image data into a multi-viewable image.

The multiview image generation unit 133 outputs 2D/3D image data RGB2D/RGB3D and timing signals synchronized with it to the display panel control unit 135. Further, the multiview image generation unit 133 outputs an input image discrimination signal SIMAGE for discriminating the addressing periods of the first and second image data RGB1 and RGB2 and a left and right image discrimination signal SLR for discriminating the addressing periods of the left-eye image data and the right-eye image data to the liquid crystal shutter glass control unit 134. The input image discrimination signal SIMAGE may be generated as a signal of more than 2 bits. The input image discrimination signal SIMAGE generated in 2 bits may be generated as '0' (low level) in synchronization with the addressing period of the first image data RGB1, and as '1' (high level) in synchronization with the addressing period of the second image data RGB2. The left and right image discrimination signal SLR may be generated at a low level (or high level) during the addressing period of the left-eye image data, and generated at a high level (or low level) during the addressing period of the right-eye image data.

The liquid crystal shutter glass control unit 134 receives the input image discrimination signal SIMAGE and the left and right image discrimination signal SLR from the multiview image generation unit 133, and outputs liquid crystal shutter glass control signals CST1(L), CST1(R), CST2(L), and CST2(R) for controlling the liquid crystal shutter glasses 30A and 30B, respectively. In the 2D mode, the liquid crystal shutter glass control unit 134 generates the first liquid crystal shutter glass control signals CST1(L) and CST(R) by using the input image discrimination signal SIMAGE so that the left-eye and right-eye shutters STL and STR of the first liquid crystal shutter glasses 30A are opened in synchronization with the addressing period of the first image data RGB1. In the 3D mode, the liquid crystal shutter glass control unit 134 generates second liquid crystal shutter glass control signals CST2(L) and CST2(R) by using the input image discrimination signal SIMAGE so that the left-eye and right-eye shutter STL and STR of the second liquid shutter glasses 30B are opened in synchronization with the addressing period of the second image data RGB2.

In the 3D mode, the liquid crystal shutter glass control unit 134 generates a first left-eye liquid crystal shutter glass control signal CST1(L) by using the input image discrimination SIMAGE and the left right image discrimination signal SLR so that the left-eye shutter STL of the first liquid crystal shutter glasses 30A is opened in synchronization with the addressing period of the left-eye image data RGB1(L). Moreover, the liquid crystal shutter glass control unit 134 generates a first right-eye liquid crystal shutter glass control signal CST1(R) so that the right-eye shutter STR of the first liquid crystal shutter glasses 30A is opened in synchronization with the addressing period of the right-eye image data RGB1(R) of the first image data.

In the 3D mode, the liquid crystal shutter glass control unit 134 generates a second left-eye liquid crystal shutter glass control signal CST2(L) by using the input image discrimination signal SIMAGE and the left and right image discrimination signal SLR so that the left-eye shutter STL of the second liquid crystal shutter glasses 30B is opened in synchronization with the addressing period of the left-eye image data RGB2(L) of the second image data. Further, the liquid crystal shutter glass control unit 134 generates a second right-eye liquid crystal shutter glass control signal CST2(R) so that the right-eye shutter STR of the second liquid crystal shutter glasses 30B is opened in synchronization with the addressing period of the right-eye image data RGB2(R) of the second image data.

The display panel control unit 135 receives 2D/3D image data RGB2D/RGB3D and timing signals synchronized with it from the multiview image generation unit 133. The display panel control unit 135 generates a gate control signal GCS and a data control signal DS from the 2D/3D image data RGB2D/RGB3D and the timing signals synchronized with it. The gate control signal GCS and the data control signal DCS have been already described in conjunction with FIG. 2. The display panel control unit 135 outputs the gate control signal GCS to the gate driver 110, and outputs the data control signal DS and the 2D/3D image data RGB2D/RGB3D to the data driving unit 120.

In what follows, a method for driving a stereoscopic image display device according to an exemplary embodiment of the present invention will be described in conjunction with FIGS. 4 to 9.

Figure 4:
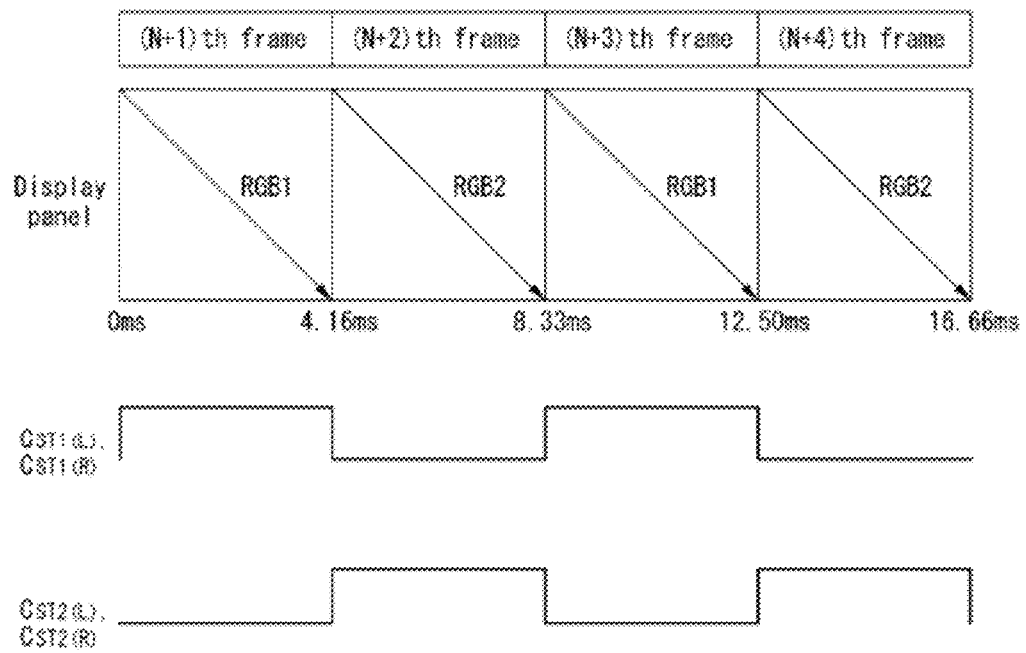
FIG. 4 is a view showing a 2D driving method of a display panel and liquid crystal shutter glasses according to a first exemplary embodiment of the present invention.
Figure 5:
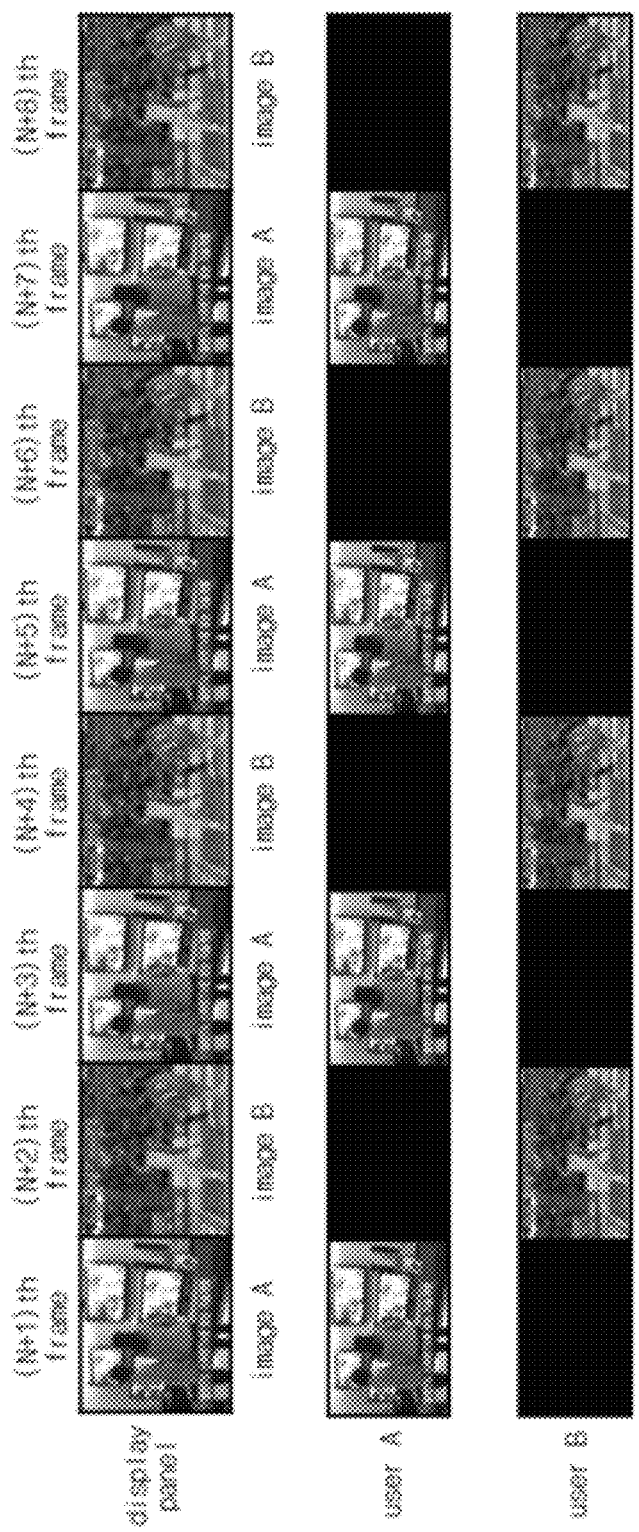
FIG. 5 is a view showing an image of the display panel according to the 2D driving method of FIG. 4 and an image that users are watching.

FIG. 4 is a view showing a 2D driving method of a display panel and liquid crystal shutter glasses according to a first exemplary embodiment of the present invention. FIG. 5 is a view showing an image of the display panel according to the 2D driving method of FIG. 4 and an image that users are watching.

The first exemplary embodiment of the present invention illustrates the case where two different 2D image data are input into the stereoscopic image display device. In the first exemplary embodiment of the present invention, first and second image data RGB1 and RGB2 are input into the control unit 130, and the multi view image generation unit 133 of the control unit 130 generates 2D image data RGB2D using the first and second image data RGB1 and RGB2. The liquid crystal shutter glass control unit 134 outputs liquid crystal shutter glass control signals CST1(L), CST1(R), CST2(L), and CST2(R) synchronized with the addressing periods of the first and second image data RGB1 and RGB2 to the first and second liquid crystal shutter glasses 30A and 30B, respectively.

Referring to FIG. 4, 2D image data RGB2D is addressed to the display panel 10 at a frame frequency of 240 Hz under control of the display panel control unit 135. Concretely, the first image data RGB1 is addressed during the (N+1)th frame, the second image data RGB2 is addressed during the (N+2)th frame, the first image data RGB1 is addressed during the (N+3)th frame, and the second image data RGB2 is addressed during the (N+4)th frame. The first liquid crystal shutter glass control signals CST1(L) and CST1(R) are generated at a high level H during the (N+1)th and (N+3)th frames to which the first image data RGB1 is addressed. The second liquid crystal shutter glass control signals CST2(L) and CST2(R) are generated at a high level H during the (N+2)th and (N+4)th frames to which the second image data RGB2 is addressed. Meanwhile, the stereoscopic image display device is implemented as a liquid crystal display, the light sources of the backlight unit may be implemented to be switched on at a predetermined duty ratio in order to reduce crosstalk.

Referring to FIG. 5, the display panel 10 time-divides a first image (image A) and a second image (image B), which are 2D images, and sequentially displays them. At this point, the first user (user A) wearing the first liquid crystal shutter glasses 30A views only the first image (image A), and the second user (user B) wearing the second liquid crystal shutter glasses 30B views only the second image (image B). As shown in FIG. 5, while the display panel 10 is driven at a frame frequency of 240 Hz, each user views either the first image (image A) or the second image (image B) at a frame frequency of 120 Hz. As a result, a multiview for allowing each user to view a different image by a single display device can be implemented.

Figure 6:
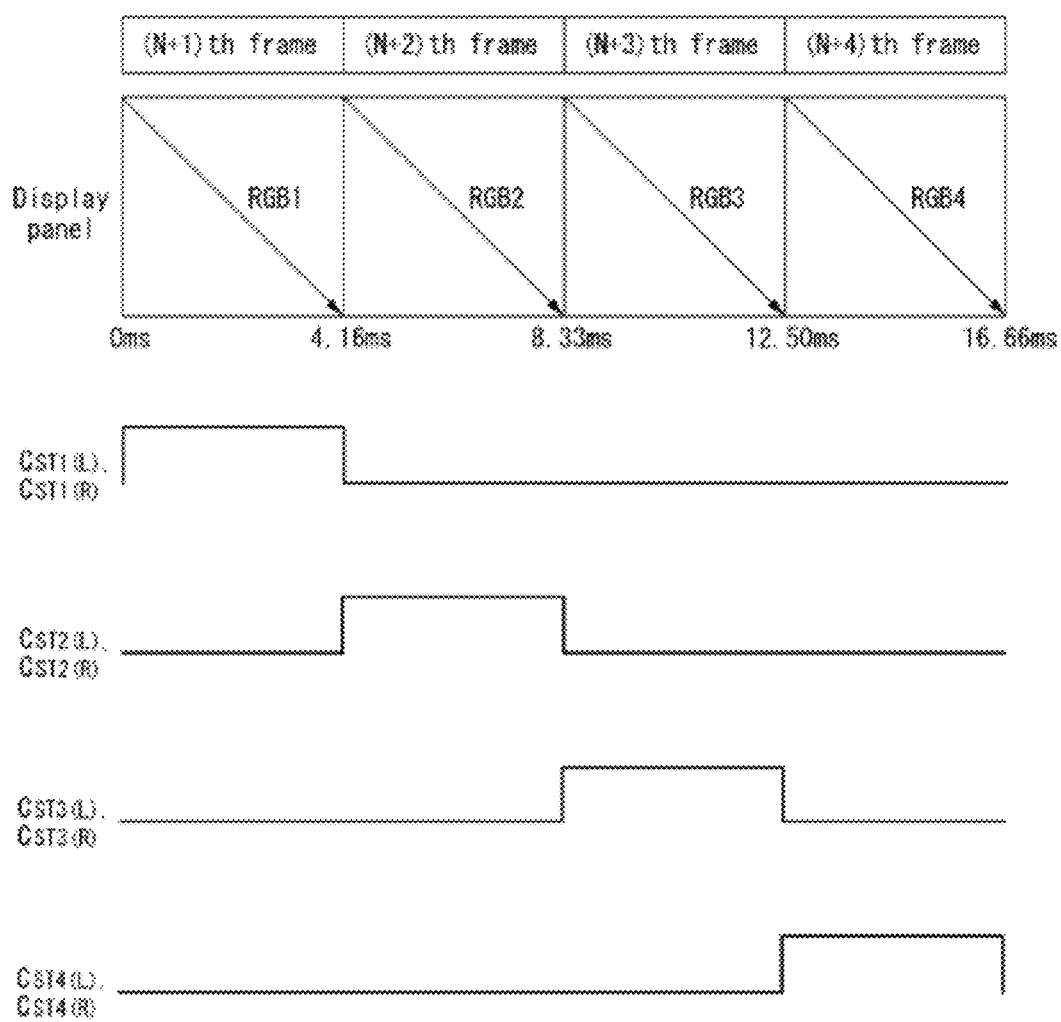
FIG. 6 is a view showing a 2D driving method of a display panel and liquid crystal shutter glasses according to a second exemplary embodiment of the present invention.
Figure 7:
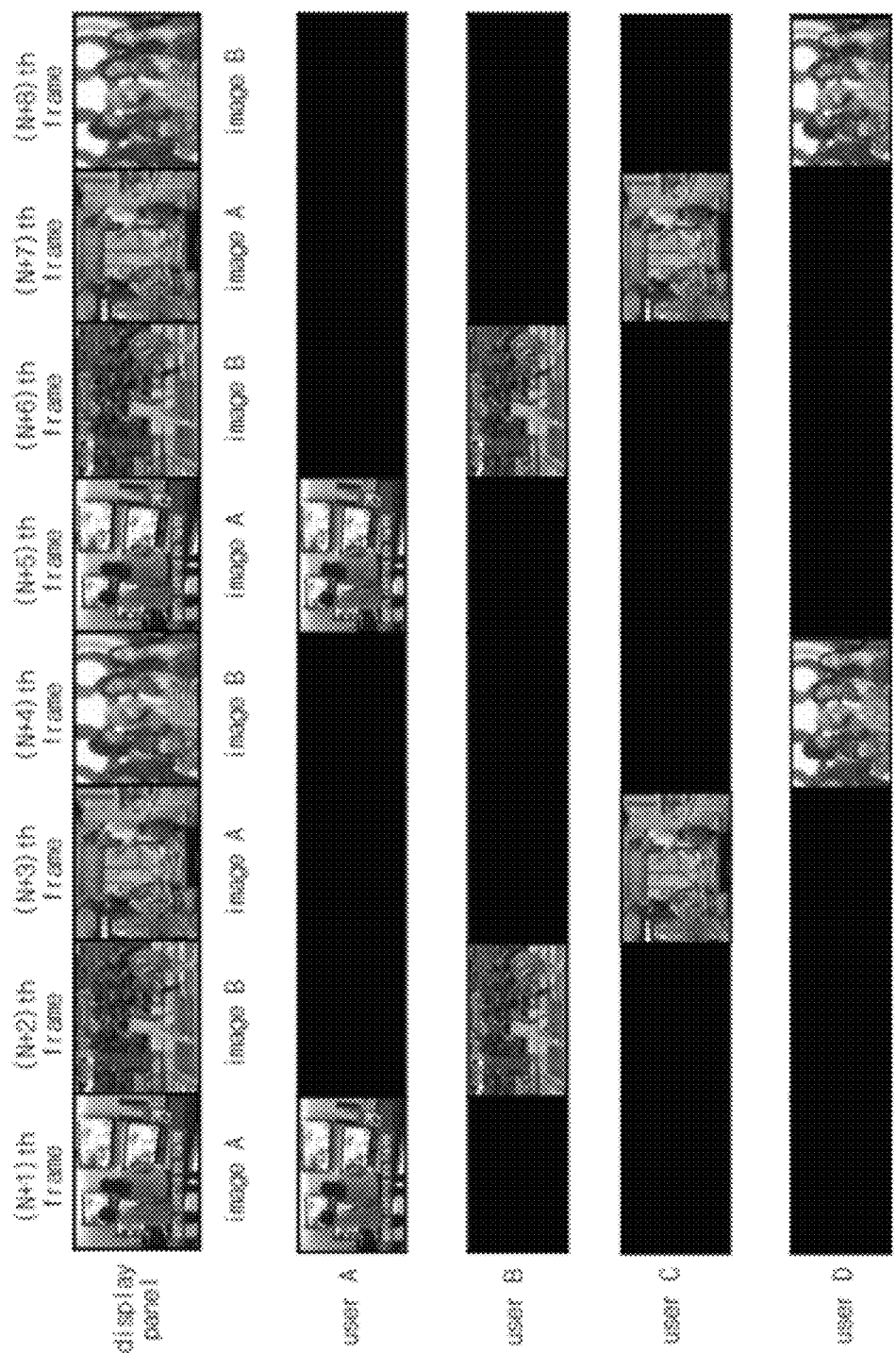
FIG. 7 is a view showing an image of the display panel according to the 2D driving method of FIG. 6 and an image that users are watching.

FIG. 6 is a view showing a 2D driving method of a display panel and liquid crystal shutter glasses according to a second exemplary embodiment of the present invention. FIG. 7 is a view showing an image of the display panel according to the 2D driving method of FIG. 6 and an image that users are watching.

The second exemplary embodiment of the present invention illustrates the case where four different 2D image data are input into the stereoscopic image display device. In the second exemplary embodiment of the present invention, the first to fourth image data RGB1, RGB2, RGB3, and RGB4 are input into the control unit 130, and the multi view image generation unit 133 of the control unit 130 generates 2D image data RGB2D using the first, second, third, and fourth image data RGB1, RGB2, RGB3, and RGB4. The liquid crystal shutter glass control unit 134 outputs liquid crystal shutter glass control signals CST1(L), CST1(R), CST2(I), CST2(R), CST3(L), CST3(R), CST4(L), and CST4(R) synchronized with the addressing periods of the first to fourth image data RGB1, RGB2, RGB3, and RGB4 to the first to fourth liquid crystal shutter glasses, respectively.

Referring to FIG. 6, 2D image data RGB2D is addressed to the display panel 10 at a frame frequency of 240 Hz under control of the display panel control unit 135. Concretely, the first image data RGB1 is addressed during the (N+1)th frame, the second image data RGB2 is addressed during the (N+2)th frame, the third image data RGB3 is addressed during the (N+3)th frame, and the fourth image data RGB4 is addressed during the (N+4)th frame. The first liquid crystal shutter glass control signals CST1(L) and CST1(R) are generated at a high level H during the (N+1)th frame to which the first image data RGB1 is addressed. The second liquid crystal shutter glass control signals CST2(L) and CST2(R) are generated at a high level H during the (N+2)th frame to which the second image data RGB2 is addressed. The third liquid crystal shutter glass control signals CST3(L) and CST3(R) are generated at a high level H during the (N+3)th frame to which the third image data RGB3 is addressed. The fourth liquid crystal shutter glass control signals CST4(L) and CST4(R) are generated at a high level H during the (N+4)th frame to which the fourth image data RGB4 is addressed. Meanwhile, the stereoscopic image display device is implemented as a liquid crystal display, the light sources of the backlight unit may be implemented to be switched on at the predetermined duty ratio in order to reduce crosstalk.

Referring to FIG. 7, the display panel 10 time-divides a first image (image A), a second image (image B), a third image (image C), and a fourth image (image D), which are 2D images, and sequentially displays them. At this point, the first user (user A) wearing the first liquid crystal shutter glasses 30A views only the first image (image A), and the second user (user B) wearing the second liquid crystal shutter glasses 30B views only the second image (image B). Moreover, the third user (user C) wearing the third liquid crystal shutter glasses 30C views only the third image (image C), and the fourth user (user D) wearing the second liquid crystal shutter glasses 30B views only the second image (image D). As shown in FIG. 7, while the display panel 10 is driven at a frame frequency of 240 Hz, each user views any one of the first image (image A), the second image (image B), the second image (image C), and the fourth image (image D) at a frame frequency of 60 Hz. As a result, a multiview for allowing each user to view a different image by a single display device can be implemented.

Figure 8:
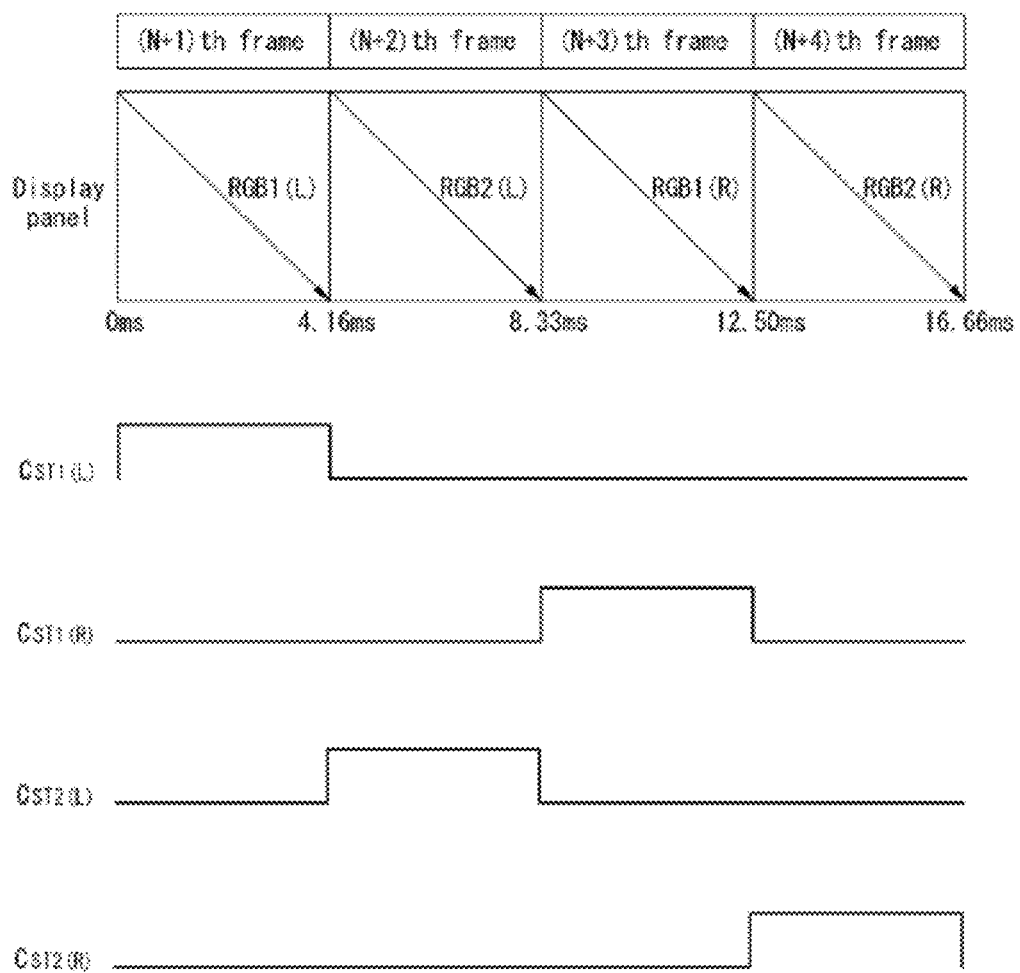
FIG. 8 is a view showing a 3D driving method of a display panel and liquid crystal shutter glasses according to a third exemplary embodiment of the present invention.
Figure 9:
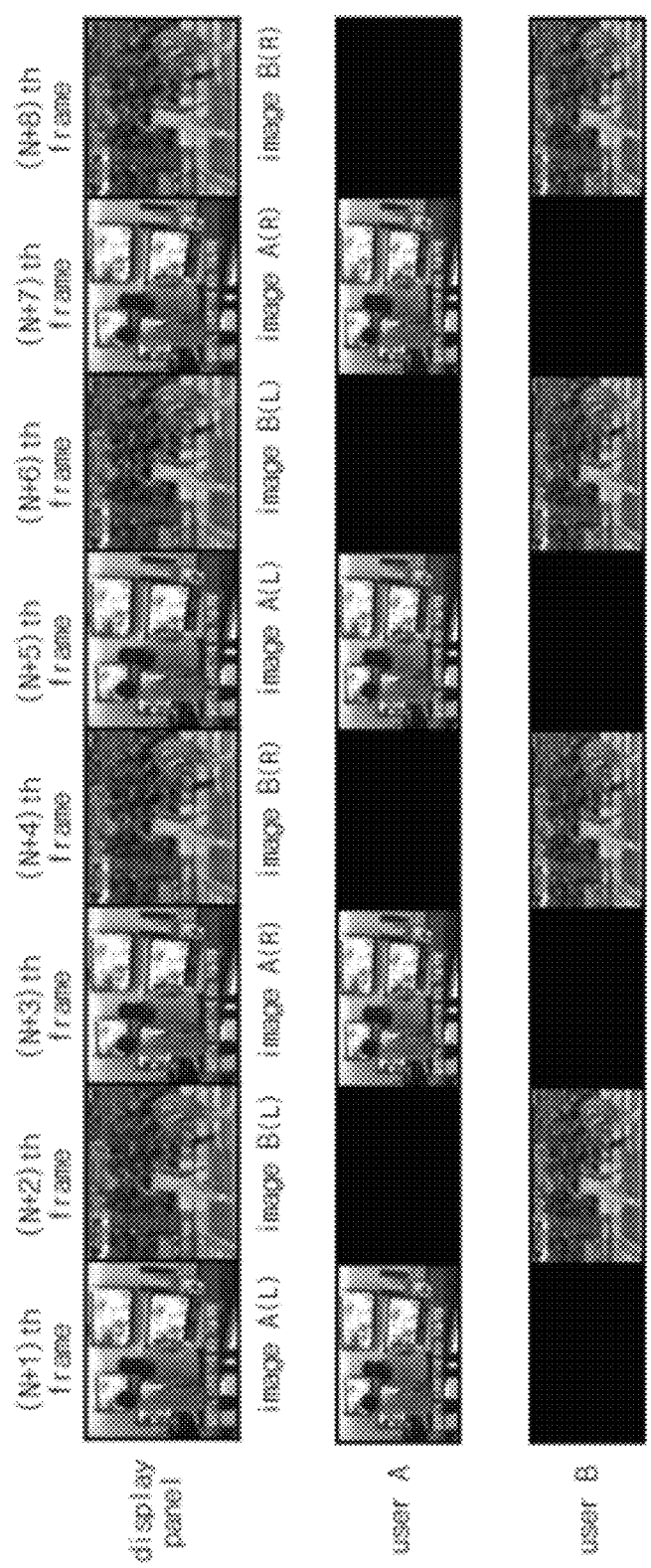
FIG. 9 is a view showing an image of the display panel according to the 3D driving method of FIG. 8 and an image that users are watching.

FIG. 8 is a view showing a 3D driving method of a display panel and liquid crystal shutter glasses according to a third exemplary embodiment of the present invention. FIG. 9 is a view showing an image of the display panel according to the 3D driving method of FIG. 8 and an image that users are watching.

The third exemplary embodiment of the present invention illustrates the case where two different 3D image data are input into the stereoscopic image display device. In the third exemplary embodiment of the present invention, first and second image data RGB1 and RGB2 are input into the control unit 130, and the 3D formatter 132 and multiview image generation unit 133 of the control unit 130 generates 3D image data RGB3D using the first and second image data RGB1 and RGB2. The liquid crystal shutter glass control unit 134 outputs first and second liquid crystal shutter glass control signals CST1(L), CST1(R), CST2(L), and CST2(R) synchronized with the addressing periods of the first and second image data RGB1 and RGB2 to the first and second liquid crystal shutter glasses 30A and 30B, respectively.

Referring to FIG. 8, 3D image data RGB3D is addressed to the display panel 10 at a frame frequency of 240 Hz under control of the display panel control unit 135. Concretely, the left-eye image data RGB1(L) of the first image data RGB1 is addressed during the (N+1)th frame, the left-eye image data RGB2(L) of the first image data is addressed during the (N+2)th frame, the right-eye image data RGB1(R) of the first image data is addressed during the (N+3)th frame, and the right-eye image data RGB2(R) of the second image data RGB2 is addressed during the (N+4)th frame. The first left-eye liquid crystal shutter glass control signal CST1(L) is generated at a high level H during the (N+1)th frame to which the left-eye image data RGB1(L) of the first image data is addressed. The right-eye liquid crystal shutter glass control signal CST1(R) is generated at a high level H during the (N+3)th frame to which the right-eye image data RGB1(R) of the first image data is addressed. The left-eye liquid crystal shutter glass control signal CST2(L) is generated at a high level H during the (N+2)th frame to which the left-eye image data RGB2(L) of the second image data is addressed. The second right-eye liquid crystal shutter glass control signal CST2(R) is generated at a high level H during the (N+4)th frame to which the right-eye image data RGB2(R) of the second image data is addressed. Meanwhile, the stereoscopic image display device is implemented as a liquid crystal display, the light sources of the backlight unit may be implemented to be switched on at the predetermined duty ratio in order to reduce crosstalk.

Referring to FIG. 9, the display panel 10 time-divides the left-eye image (image A(L)), the left-eye image (image B(L)) of a second image, the right-eye image (image A(R)) of the first image, and the right-eye image (image B(R)) of the second image, which are 3D images, and sequentially displays them. At this point, the first user (user A) wearing the first liquid crystal shutter glasses 30A views only the left-eye image and right-eye image (image A(L) and image A(R)) of the first image, and the second user (user B) wearing the second liquid crystal shutter glasses 30B views only the left-eye image and right-eye image (image B(L) and image B(R)) of the second image. As shown in FIG. 9, while the display panel 10 is driven at a frame frequency of 240 Hz, each user views either a stereoscopic image of the first image (image A) or a stereoscopic image of the second image (image B). As a result, a multiview for allowing each user to view a different image by a single display device can be implemented.

As described above, the present invention allows each of multiple users to view different 2D or 3D images by time-dividing and displaying image data at an increased driving frequency of the display panel and variably controlling the on/off timings of the shutter glasses worn by each of the multiple users. Although the exemplary embodiments of the present invention have been illustrated with respect to driving at a frame frequency of 240 Hz, it should be noted that the present invention is not limited thereto. Moreover, it should be noted that, although the exemplary embodiments of the present invention have been illustrated with respect to the use of two or four liquid crystal shutter glasses, the present invention is not limited thereto. That is to say, in the present invention, the more the driving frequency of the display panel, the larger the number of liquid crystal shutter glasses, thereby allowing more users to view different images from each other.

Although embodiments have been described with reference to a number of illustrative embodiments thereof, it should be understood that numerous other modifications and embodiments can be devised by those skilled in the art that will fall within the spirit and scope of the principles of this disclosure. More particularly, numerous variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A stereoscopic image display device comprising:
   a display panel that displays a 2D image in the 2D mode and displays a 3D image in the 3D mode;
   a control unit that receives first to m-th image data (m is a natural number greater than 2), and in the 3D mode time-divides and sequentially outputs the left-eye image data of each of the first to m-th image data, and then time-divides and sequentially outputs the right-eye image data of each of the first to m-th image data after the sequential output of the left-eye image data of each of the first to m-th image data is complete, the control unit including an image data compensation unit configured to convert a frame frequency of the received first to m-th image data to a higher frame frequency; and
   first to m-th liquid crystal shutter glasses that open and close the left-eye shutter and the right-eye shutter in synchronization with each of the first to m-th liquid crystal shutter glass control signals generated from the control unit,
   wherein, in the 3D mode, only the left-eye shutter of each of the first to m-th liquid crystal shutter glasses is opened in synchronization with a period during which the left-eye image data of each of the first to m-th image data is output, and only the right-eye shutter of each of the first to m-th liquid crystal shutter glasses is opened in synchronization with a period during which the right-eye image data of each of the first to m-th image data is output.

2. The stereoscopic image display device of claim 1, wherein the control unit comprises:
   a 3D formatter that alternately outputs the left-eye image data and right-eye image data of each of the first to m-th image data in the 3D mode;
   a multiview image generation unit that generates the 3D image data in the 3D mode, which is obtained by time-dividing and sequentially outputting the left-eye image data of each of the first to m-th image data output from the 3D formatter, and time-dividing and sequentially outputting the right-eye image data of each of the first to m-th image data; and a liquid crystal shutter glass control unit that generates the first to m-th liquid crystal shutter glass control signals in the 3D mode so that only the left-eye shutter of each of the first to m-th liquid crystal shutter glasses is opened in synchronization with a period during which the left-eye image data of each of the first to m-th image data is output, and only the right-eye shutter of each of the first to m-th liquid crystal shutter glasses is opened in synchronization with a period during which the right-eye image data of each of the first to m-th image data is output.

3. The stereoscopic image display device of claim 2, wherein the image data compensation unit is further configured to convert the first to m-th image data to the higher frame frequency using a motion estimation/motion compensation scheme and to output the first to m-th image data of the higher frame to the 3D formatter.

4. The stereoscopic image display device of claim 1, wherein the control unit addresses 2D image data to the display panel in the 2D mode, the 2D image data being obtained by time-dividing and sequentially outputting each of the first to m-th image data, and
wherein, in the 2D mode, the left-eye and right-eye shutters of each of the first to m-th liquid crystal shutter glasses are opened in synchronization with a period during which each of the first to m-th image data is output.

5. The stereoscopic image display device of claim 4, wherein the control unit comprises:
a 3D formatter that alternately outputs the first to m-th image data as it is in the 2D mode;
a multiview image generation unit that generates the 2D image data in the 2D mode, which is obtained by time-dividing and sequentially outputting each of the first to m-th image data output from the 3D formatter; and
a liquid crystal shutter glass control unit that generates the first to m-th liquid crystal shutter glass control signals in the 2D mode so that the left-eye and right-eye shutters of the first to m-th liquid crystal shutter glasses are opened in synchronization with a period during which the first to m-th image data is output.

6. The stereoscopic image display device of claim 1, wherein the image data compensation unit is further configured to convert the frame frequency of the received first to m-th image data to be four times the frame frequency when m is 2.

7. A method for driving a stereoscopic image display device comprising a display panel that displays a 2D image in a 2D mode and displays a 3D image in a 3D mode, the method comprising:
receiving first to m-th image data (m is a natural number greater than 2), and converting a frame frequency of the received first to m-th image data to a higher frame frequency;
in the 3D mode time-divides and sequentially outputs the left-eye image data of each of the first to m-th image data, and then time-divides and sequentially outputs the right-eye image data of each of the first to m-th image data after the sequential output of the left-eye image data of each of the first to m-th image data is complete; and
opening and closing the left-eye shutter and the right-eye shutter in synchronization with each of the first to m-th liquid crystal shutter glass control signals generated from the control unit,
wherein, in the 3D mode, only the left-eye shutter of each of the first to m-th liquid crystal shutter glasses is opened in synchronization with a period during which the left-eye image data of each of the first to m-th image data is output, and only the right-eye shutter of each of the first to m-th liquid crystal shutter glasses is opened in synchronization with a period during which the right-eye image data of each of the first to m-th image data is output.

8. The method of claim 7, further comprising addressing 3D image data to the display panel, the addressing of the 3D image data comprising:
alternately outputting the left-eye image data and right-eye image data of each of the first to m-th image data in the 3D mode;
generating the 3D image data in the 3D mode, which is obtained by time-dividing and sequentially outputting the left-eye image data of each of the first to m-th image data output from a 3D formatter, and time-dividing and sequentially outputting the right-eye image data of each of the first to m-th image data; and
generating the first to m-th liquid crystal shutter glass control signals in the 3D mode so that only the left-eye shutter of each of the first to m-th liquid crystal shutter glasses is opened in synchronization with a period during which the left-eye image data of each of the first to m-th image data is output, and only the right-eye shutter of each of the first to m-th liquid crystal shutter glasses is opened in synchronization with a period during which the right-eye image data of each of the first to m-th image data is output.

9. The method of claim 8, further comprising outputting the first to m-th image data having a higher frame frequency to the 3D formatter.

10. The method of claim 8, wherein the addressing of the 3D image data to the display panel further comprises addressing 2D image data to the display panel in the 2D mode, the 2D image data being obtained by time-dividing and sequentially outputting each of the first to m-th image data, and
wherein, in the 2D mode, the left-eye and right-eye shutters of each of the first to m-th liquid crystal shutter glasses are opened in synchronization with a period during which each of the first to m-th image data is output.

11. The method of claim 10, wherein the addressing of the 2D image data to the display panel comprises:
alternately outputting the first to m-th image data as it is in the 2D mode without conversion into a 3D format;
generating the 2D image data in the 2D mode, which is obtained by time-dividing and sequentially outputting each of the first to m-th image data output from the 3D formatter; and
generating the first to m-th liquid crystal shutter glass control signals in the 2D mode so that the left-eye and right-eye shutters of the first to m-th liquid crystal shutter glasses are opened in synchronization with a period during which the first to m-th image data is output.

12. The method of claim 7, wherein the frame frequency of the received first to m-th image data is converted to be four times the frame frequency when m is 2.

* * * * *